April 7, 1964  D. B. McINTIRE  3,128,188
BEER LAGERING PROCESS
Filed Sept. 2, 1960
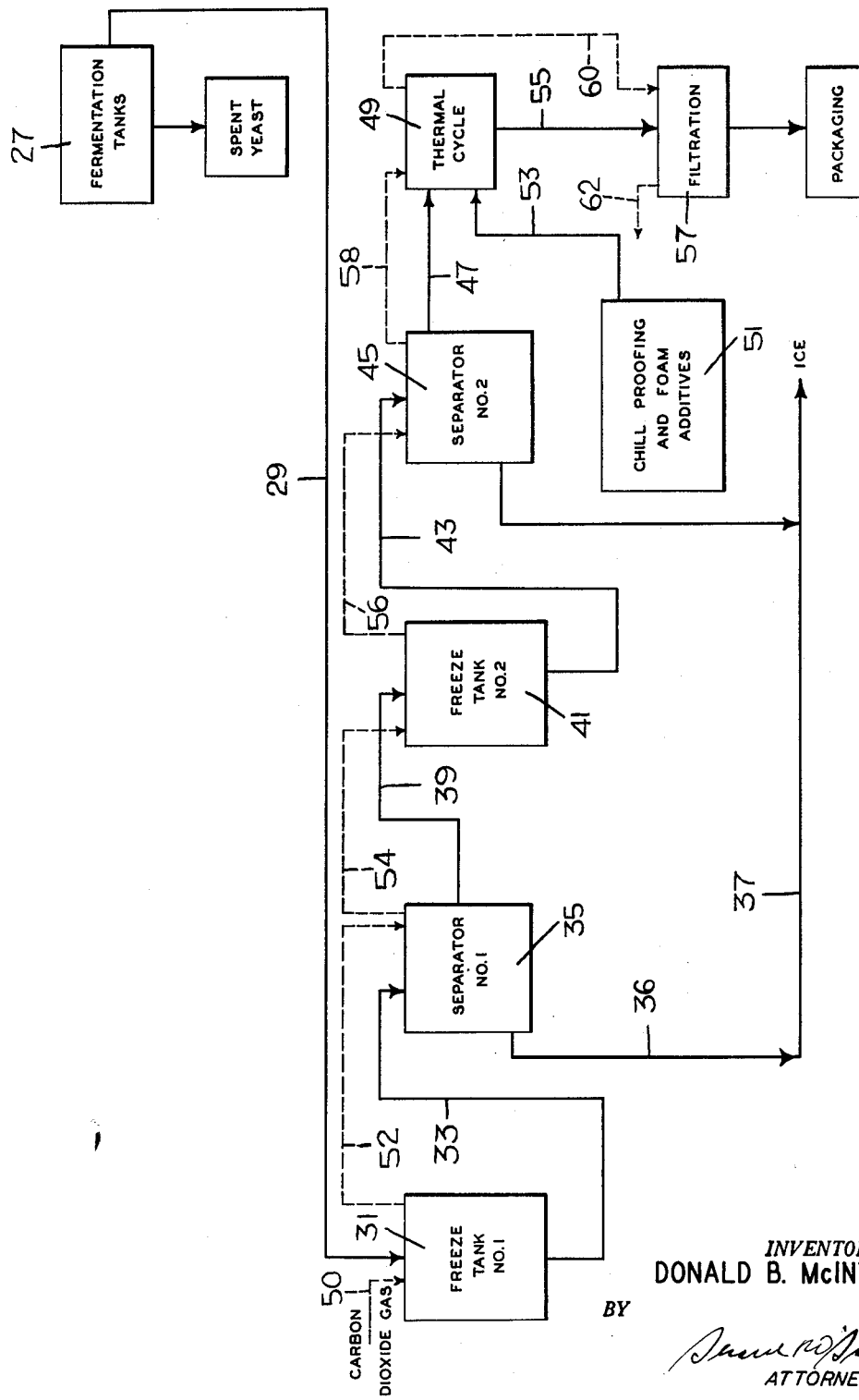
INVENTOR.
DONALD B. McINTIRE
BY
ATTORNEY

United States Patent Office 3,128,188
Patented Apr. 7, 1964

3,128,188
BEER LAGERING PROCESS
Donald B. McIntire, Milwaukee, Wis., assignor to Union Carbide Corporation, a corporation of New York
Filed Sept. 2, 1960, Ser. No. 53,782
2 Claims. (Cl. 99—48)

The present invention relates to a process for lagering beer.

A perennial problem in the art of brewing beer is the lagering process. Heretofore, beer has been lagered by storing and aging it for several days, thus requiring a considerable amount of tankage. It has long been recognized that if unlagered beer coming off the fermenters could be lagered without storing it for several days, a considerable saving in time and equipment would be effected.

It is, therefore, the main object of the present invention to provide a process for producing lagered beer without storing the beer.

It is another object of the invention to provide a process for producing a lagered beer which remains clear after being subjected to relatively long storage periods and/or reduced temperatures.

Other aims and advantages of the present invention will be apparent from the following description and appended claims.

As used herein, the following terms have the following meanings:

The term "ruh beer" refers to beer taken directly from the fermenters.

The term "lagering" refers to a process wherein the percentages of yeast cells, hop fragments, and proteins in ruh beer are reduced so as to improve the turbidity and flavor of the beer.

In accordance with the present invention, there is provided a process for lagering ruh beer comprising freezing water from the ruh beer so as to produce a slurry of concentrated beer, ice, and other solids; and removing the ice and other solids from the concentrated beer, while maintaining the beer in a substantially inert atmosphere throughout all process steps. Thus, the inventive process produces concentrated, lagered beer by freeze concentrating ruh beer.

Another novel and important feature of the present invention resides in the removal of calcium oxalate from the lagered beer product. Calcium oxalate is usually formed during normal brewing processes, and it is well established in the brewing literature that this compound is an extremely undesirable constituent of conventional beer. The oxalate normally "plates out" in processing tanks and lines, forming "beer stone" and resulting in a complex cleaning problem. Calcium oxalate also contributes to haze and offensive flavors in beer and is generally considered to contribute to the highly undesirable phenomenon known as "gushing." Oxalates are also undesirable from a nutritional standpoint, since an excess of oxalates in the body is one factor which reduces the absorption of calcium from the intestine. While conventional beer always contains a substantial portion of oxalate, both the lagered beer concentrate formed by the present invention and the reconstituted product contain negligible amounts of oxalate because the calcium oxalate is precipitated out during the freezing step, and then subsequently removed from the concentrated beer along with the ice and other solids. Thus, not only is the expensive and time-consuming storage process eliminated by the inventive process, but the quality of the final product is unexpectedly and significantly improved.

In addition to, and possibly as a result of, the removal of calcium oxalate, the process of the present invention improves the flavor and haze stability of the resultant beer product. Indeed, beer produced by diluting the novel concentrate appears to be superior in flavor and clarity not only to other reconstituted concentrates, but also to fresh, high-quality draft beer, even though the concentrate and/or the reconstituted product may be as much as a year old. Because of its inherent bacteriological stability, the stabilized beer concentrate may be stored for long periods without the deterioration in flavor, clarity, and uniformity which conventional lagered beer, even when pasteurized, always suffers.

Although the inventive process can theoretically be used to produce lagered beer of any desired concentration, concentration above about five-fold, i.e., a concentrate possessing one-fifth the volume of the beer as originally fermented, usually results in deterioration of the desirable qualities of the product. Accordingly, less than five-fold volume concentrations are deemed preferable.

The process of the present invention will now be explained in greater detail by referring to the preferred embodiment illustrated in the drawing.

Ruh beer is removed from the fermentation tanks 27 and passed through a line 29 into a freeze tank 31. A slurry of concentrated beer, ice, and other solids, such as yeast cells, hop fragments, proteins, and calcium oxalate, is formed in the freeze tank 31 by freezing at least part of the water from the ruh beer. The freeze tanks are preferably cold-walled tanks with agitating means to prevent formation of ice on the tank walls. From the freeze tank 31, the slurry of concentrated beer, ice, and other solids is passed through a line 33 into a separator 35. The separator 35, which is preferably a centrifugal separator but may be any other separating means, removes the ice and other solids from the concentrated beer. The removed ice and other solids are discharged from the separator 35 through line 36 into manifold 37 where they can be discarded or passed into a recovery system to recover any beer entrained on the removed ice.

Concentrated beer from separator 35 is passed through line 39 into a second freeze tank 41. The slurry of concentrated beer and ice from tank 41 is then passed through line 43 into a second separator 45. Of course, additional freeze tank-separator stages may also be employed. The beer that is discharged from the final separator is a lagered beer concentrate. Yeast cells, hop fragments, and suspended proteins have been removed by the freeze concentration process, and the concentrated beer can be reconstituted to any desired strength. As mentioned above, the inventive process also removes calcium oxalate from the lagered beer product, and produces a beer product which has a haze stability superior to that of conventionally lagered beer.

Concentrated lagered beer from separator 45 is passed through a line 47 into a thermal cycle 49. Chill-proofing and foam additives 51 are added to the concentrated beer in the thermal cycle 49 through line 53, and the beer and additives are then heated to a temperature between about 80° F. and about 130° F., i.e., to the optimum activation temperature for the enzymatic system of the beer and additives. Chill-proofing and foam additives are well known in the art and are added to reduce turbidity, improve the haze stability of the beer, and enhance the foaming properties of the beer. In addition to optimizing the enzymatic activities of the additives in the beer, the heating step also re-solubilizes the dextrins in the concentrated beer.

The final step in the thermal cycle 49 is cooling the hot solution to storage temperature, which is usually about 32° F. The treated solution from the thermal cycle 49 is passed through a line 55 into a filtration system 57, and the filtered product is finally packaged.

The beer is maintained in a substantially inert atmosphere, preferably of carbon dioxide, from the time it leaves the fermentation tanks throughout all subsequent operations. The head space of the freeze tank 31 is blanketed by carbon dioxide gas from a line 50. From freeze tank 31, the carbon dioxide passes through line 52 into separator 35, through line 54 into freeze tank 41, through line 56 into separator 45, through line 58 into the thermal cycle 49, through line 60 into the filtration system 57, and is finally exhausted through line 62. Of course, the final product is also packaged or stored under non-oxidizing conditions. The carbon dioxide should be maintained at a pressure sufficient to insure that any leakage in the process system is outward.

A quantity of ruh beer was lagered according to the process steps shown in the flow sheet of the drawing and concentrated to a four-fold concentrate. Ruh beer from the fermentation tanks was continuously fed into the first freeze tank at the rate of 90 gal./hr. The ruh beer was initially at a temperature of 32° F. and a concentration of 6.7° Brix. Two freeze tank-centrifuge stages were employed in the freeze concentration process. In the first stage, the temperature of the slurry leaving the freeze tank was 24° F., the ice leaving the centrifuge was 25° F. and 1.5° Brix, the liquor leaving the centrifuge was 25° F. and 14° Brix. In the second stage, the temperature of the slurry leaving the freeze tank was 8° F., the ice leaving the centrifuge was 9° F. and 5° Brix, and the liquor leaving the centrifuge was 9° F. and 27° Brix. The lagered beer concentrate was withdrawn at the rate of 20 gal./hr. Carbon dioxide was supplied to the system at a pressure of between 4 and 5 inches of water, which was sufficient to insure that any leakage was outward. The following table shows comparative analyses of the four-fold concentrate, the reconstituted beer, and conventional beer.

TABLE

*Chemical Composition of Conventional Beer, Concentrate, and Reconstituted Beer*

|  | Conventional Beer | Concentrates | Reconstituted Concentrate |
|---|---|---|---|
| Alcohol (Percent By Wt.) | 3.75 | 15.00 | 3.74 |
| Do | 4.81 | 19.24 | 4.81 |
| Extract (Percent By Wt.) | 4.82 | 19.72 | 4.67 |
| Acidity (As Percent Lactic Acid) | 0.140 |  | 0.118 |
| Protein (Percent By Wt.) | 0.39 | 1.40 | 0.33 |
| Ash (Percent By Wt.) | 0.1658 | 0.6640 | 0.1740 |
| Reducing Sugars (Percent By Wt.) | 1.14 | 4.92 | 1.11 |
| Dextrins (Percent By Wt.) | 2.30 | 10.56 | 2.48 |
| pH (Percent By Wt.) | 4.34 |  | 4.50 |
| Color (Degrees Lovibond) | 3.50 |  | 2.80 |
| Iron (p.p.m.) | 0.06 | 0.40 | 0.20 |
| Calcium (p.p.m.) | 65.1 | 242.0 | 87.8 |
| Sodium (p.p.m.) | 67.7 | 282.0 | 73.5 |
| Potassium (p.p.m.) | 408.0 | 1,650.0 | 415.0 |
| Magnesium (p.p.m.) | 105.0 | 432.0 | 122.0 |
| Sulphate (p.p.m.) | 380.0 | 1,524.0 | 392.0 |
| Oxalate (p.p.m.) | 6.55 | Negligible | 0.05 |
| Inorganic Phosphate (p.p.m.) | 474.0 | 1,940.0 | 472.0 |
| Organic Phosphate (p.p.m.) | 132.0 | 532.0 | 123.0 |
| Iso-Humolone (p.p.m.) | 19.8 | 44.4 | 11.3 |

The oxalate content of both the concentrate and the reconstituted concentrate was found to be negligible. Also, the alcohol content of the reconstituted concentrate was identical to that of the conventional beer.

A second quantity of ruh beer was prepared by the same process to produce a two-fold concentrate. Ruh beer was withdrawn from the fermentation tanks and fed into the first freeze tank at the rate of 90 gal./hr., at a temperature of 32° F., and at a concentration of 6.7° Brix. Two stages were again employed in the freeze concentration process. In the first stage, the temperature of the slurry leaving the freeze tank was 27° F., the ice leaving the centrifuge was at 28° F. and 0.6° Brix, and the liquor leaving the centrifuge was 27° F. and 9.8° Brix. In the second stage, the temperature of the slurry was 24.5° F., the ice leaving the centrifuge was 24° F. and 1.2° Brix, and the liquor leaving the centrifuge was 25° F. and 13.4° Brix. The concentrated product was withdrawn at a rate of 40 gal./hr., and a carbon dioxide atmosphere was maintained throughout the system at a pressure of between 2 and 5 inches of water.

The oxalate content of the concentrate and reconstituted concentrate was again negligible.

What is claimed is:

1. A process for lagering ruh beer comprising freezing water from said ruh beer so as to produce a slurry of concentrated beer, ice, and other solids, said concentrated beer being at less than about a fivefold volume concentration; and removing said ice and other solids from said concentrated beer, while maintaining the beer in a substantially inert atmosphere throughout all said process steps, thereby lagering said ruh beer without extensive storage periods.

2. A process for lagering ruh beer comprising freezing water from said ruh beer so as to produce a slurry of concentrated beer, ice, yeast cells, hop fragmments, and calcium oxalate, said concentrated beer being at less than about a fivefold volume concentration; and removing said ice, yeast cells, hop fragments, and calcium oxalate from said concentrated beer, while maintaining the beer in a substantially inert atmosphere throughout all said process steps, thereby lagering said ruh beer without extensive storage periods.

References Cited in the file of this patent

UNITED STATES PATENTS

| 2,088,360 | Ashley | July 27, 1937 |
| 2,088,712 | Melton | Aug. 3, 1937 |
| 2,131,885 | Fox | Oct. 4, 1938 |
| 2,912,333 | Stone et al. | Nov. 10, 1959 |

FOREIGN PATENTS

| 1,025 | Great Britain | of 1879 |
| 4,910 | Great Britain | of 1879 |

OTHER REFERENCES

Industrial and Engineering Chemistry, February 1953, pages 11A and 13A.